US008232513B2

(12) United States Patent
Ozawa (10) Patent No.: US 8,232,513 B2
(45) Date of Patent: Jul. 31, 2012

(54) PROJECTOR, LIGHT SOURCE LIGHTING DEVICE HAVING A STARTING CONDITION ADJUSTMENT SECTION, AND METHOD OF CONTROLLING PROJECTOR

(75) Inventor: Takaaki Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 419 days.

(21) Appl. No.: 12/644,115

(22) Filed: Dec. 22, 2009

(65) Prior Publication Data

US 2010/0165304 A1 Jul. 1, 2010

(30) Foreign Application Priority Data

Dec. 26, 2008 (JP) ................... 2008-332972
Dec. 21, 2009 (JP) ................... 2009-288742

(51) Int. Cl.
*G01J 1/32* (2006.01)
(52) U.S. Cl. ........................................ 250/205; 353/85
(58) Field of Classification Search .................. 250/205, 250/214 R, 208.1; 353/85–87, 119; 396/190, 396/178; 362/229, 265, 259, 272; 315/409, 315/410, 101, 109, 154, 182, 197–199
See application file for complete search history.

(56) References Cited

U.S. PATENT DOCUMENTS 7,737,387 B2 * 6/2010 Hsu ............................... 250/205

FOREIGN PATENT DOCUMENTS

| JP | 7-057888 A | 3/1995 |
| JP | 2005-310484 A | 11/2005 |
| JP | 2006-292984 A | 10/2006 |
| JP | 2008-123785 A | 5/2008 |
| JP | 2008-305568 A | 12/2008 |

* cited by examiner

*Primary Examiner* — Que T Le
(74) *Attorney, Agent, or Firm* — AdvantEdge Law Group, LLC (57) ABSTRACT

A projector adapted to modulate light emitted from a light source and project the light modulated, includes: a light source lighting device adapted to perform a starting operation for starting lighting of the light source; a past result information storing section adapted to store past result information when the light source lights due to the starting operation; and a starting condition adjustment section adapted to adjust an operation condition in the starting operation to be performed later, based on the past result information stored in the past result information storing section.

9 Claims, 5 Drawing Sheets

PROJECTOR, LIGHT SOURCE LIGHTING DEVICE HAVING A STARTING CONDITION ADJUSTMENT SECTION, AND METHOD OF CONTROLLING PROJECTOR

CROSS-REFERENCE

The present application claims priority from Japanese Patent Application No. 2008-332972 filed on Dec. 26, 2008, and No. 2009-288742 filed on Dec. 21, 2009, which is hereby incorporated by reference in its entirety.

BACKGROUND

A projector for modulating light emitted from a discharge light source lamp and projecting the modulated light is provided with a light source lighting device, which performs a predetermined starting operation (application of an ignition pulse), thereby starting lighting of the light source lamp (see, e.g., Japanese Patent Publication No. 2008-123785). If the light source lamp does not light (turn on) after the starting operation is continued for a predetermined period of time, the light source lighting device performs the starting operation again after a predetermined idle period (interval), and thereafter repeats this operation until the light source lamp lights. Therefore, various conditions (e.g., an applied voltage, a pulse width, an application period of time of each operation, and a length of the interval) of the starting operation are set to be the optimum conditions based on experimental results so as not to repeat the starting operation many times.

However, since the conditions most appropriate to light the light source lamp are different in accordance with the variations (individual differences) in characteristics of the light source lamp and the light source lighting device, temporal changes, and operation environment, the situation that the starting operation needs to be repeatedly performed many times might occur in some projectors. In such a case, much time is consumed before the light source lamp is lit, which causes the user to wait.

SUMMARY

Various embodiments may have an advantage of solving at least a part of the problem described above, and can be realized as following embodiments and aspects.

According to at least one embodiment of the disclosure, there is provided a projector adapted to modulate light emitted from a light source and project the modulated light including a light source lighting device adapted to perform a starting operation for starting lighting of the light source, a past result information storing section adapted to store past result information when the light source lights due to the starting operation, and a starting condition adjustment section adapted to adjust an operation condition in the starting operation to be performed later, based on the past result information stored in the past result information storing section.

According to the projector, since the starting condition adjustment section adjusts, based on the past result information when the light source lights due to the starting operation, the operation condition in the later starting operations, it becomes possible to perform the later starting operations with the preferable starting condition based on the past results of the actual starting operations, thus it becomes possible to reduce the period of time taken before the light source starts to light.

According to at least one embodiment of the disclosure, in the projector of the above embodiment, the light source lighting device performs the starting operation a plurality of times if the light source fails to light with the starting operation performed once, and that the past result information storing section stores a number of times of the starting operation required for lighting the light source as the past result information.

According to at least one embodiment of the disclosure, in the projector of any of the above embodiments, the starting condition adjustment section sets duration of each execution of the starting operation in a manner that the larger a number of times of the starting operation is, the longer the duration becomes.

According to the projector, the starting condition adjustment section sets duration of each execution of the starting operation in a manner that the larger a number of times of the starting operation is, the longer the duration becomes. In other words, in the case in which the number of times of the starting operation is relatively large, namely in the case in which the number of times of the case in which the light source fails to light despite the execution of the starting operation is large, the duration of each execution of the starting operation becomes longer, and therefore, the probability of getting to light within a single starting operation is raised, and it becomes possible to reduce the period of time taken before the light source starts to light. On the other hand, in the case in which the number of times of the starting operation is relatively small, namely in the case in which the lighting property of the light source is relatively preferable, the duration of each execution of the starting operation becomes shorter, and therefore, even in the case in which the light source becomes accidentally in the non-lighting state with the starting operation performed once, it becomes that the subsequent starting operation is commenced quickly, and also in this case, the period of time taken before the light source starts to light can be reduced.

According to at least one embodiment of the disclosure, in the projector of any of the above embodiments, the light source lighting device performs the starting operation a plurality of times if the light source fails to light with the starting operation performed once, and that the past result information storing section stores a period of time as the past result information, the period of time from time when the starting operation is commenced to time when the light source lights.

According to at least one embodiment of the disclosure, in the projector of any of the above embodiments, the starting condition adjustment section sets duration of each execution of the starting operation in a manner that the longer the period of time required to be taken before the light source lights is, the longer the duration becomes.

According to the projector, since the starting condition adjustment section set the duration of each execution of the starting operation in a manner that the longer the period of time (the actual starting time) required to be taken from when the starting operation, which causes the light source to light, is commenced to when the light source lights is, the longer the duration becomes, even in the case of the light source having a tendency of requiring relatively long period of time before lighting, it can be prevented that shortage of the duration of the starting operation occurs resulting in the non-lighting state. As a result, the probability of getting to light within a single starting operation is raised, and it becomes possible to reduce the period of time taken before the light source starts to light. On the other hand, since the duration of each execution of the starting operation becomes shorter in the case in which the actual starting time is relatively short, even in the case in which the light source having a tendency of requiring relatively short period of time before lighting becomes accidentally in the non-lighting state, the subsequent starting operation is commenced quickly, and therefore, the period of time taken before the light source starts to light can be reduced.

According to at least one embodiment of the disclosure, in the projector of any of the above embodiments, the past result information storing section cumulatively stores the past result information, and that the starting condition adjustment section adjusts the operation condition based on the past result information of a plurality of cases stored cumulatively.

According to the projector, since the starting condition adjustment section adjusts the operation condition based on the cumulatively stored past result information, the influence due to the accidental result can further be reduced compared to the case based only on the past result information of a single starting operation.

According to at least one embodiment of the disclosure, there is provided a light source lighting device adapted to perform a starting operation for starting lighting of the light source, including a past result information storing section adapted to store past result information when the light source lights due to the starting operation, and a starting condition adjustment section adapted to adjust an operation condition in the starting operation to be performed later, based on the past result information stored in the past result information storing section.

According to the light source lighting device, since the starting condition adjustment section adjusts the operation condition in the later starting operation based on the past result information when the light source lights due to the starting operation, it becomes possible to perform the later starting operation with the operation condition corresponding to the result of the actual starting operation. As a result, it becomes easy to light the light source, and it becomes possible to reduce the period of time taken before the light source starts to light.

According to at least one embodiment of the disclosure, there is provided a method of controlling a projector adapted to modulate light emitted from a light source and project the light modulated, including the steps of (a) performing a starting operation for starting lighting of the light source, (b) storing past result information when the light source lights due to the starting operation, and (c) adjusting an operation condition in the starting operation to be performed later, based on the past result information stored in step (b).

According to the method of controlling a projector, since the operation condition in the later starting operation is adjusted based on the past result information when the light source lights due to the starting operation, it becomes possible to perform the later starting operation with the operation condition corresponding to the result of the actual starting operation. As a result, it becomes easy to light the light source, and it becomes possible to reduce the period of time taken before the light source starts to light.

Further, in the case in which the projector and the method of controlling a projector described above are configured using the computer provided to the projector, the aspects of the invention described above may be configured as aspects of a program for realizing the function, or a recording medium recording the program in a computer readable manner. As a recording medium, a flexible disk, a CD-ROM, a magnetooptical disk, an IC card, a ROM cartridge, an internal storage (e.g., a memory device such as RAM or ROM) and an external storage of the projector, or other various medium the computer can read can be used.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

First Embodiment

Hereinafter, as a first embodiment of the invention, a projector for modulating light emitted from a light source and projecting the modulated light will be explained.

Figure 1:
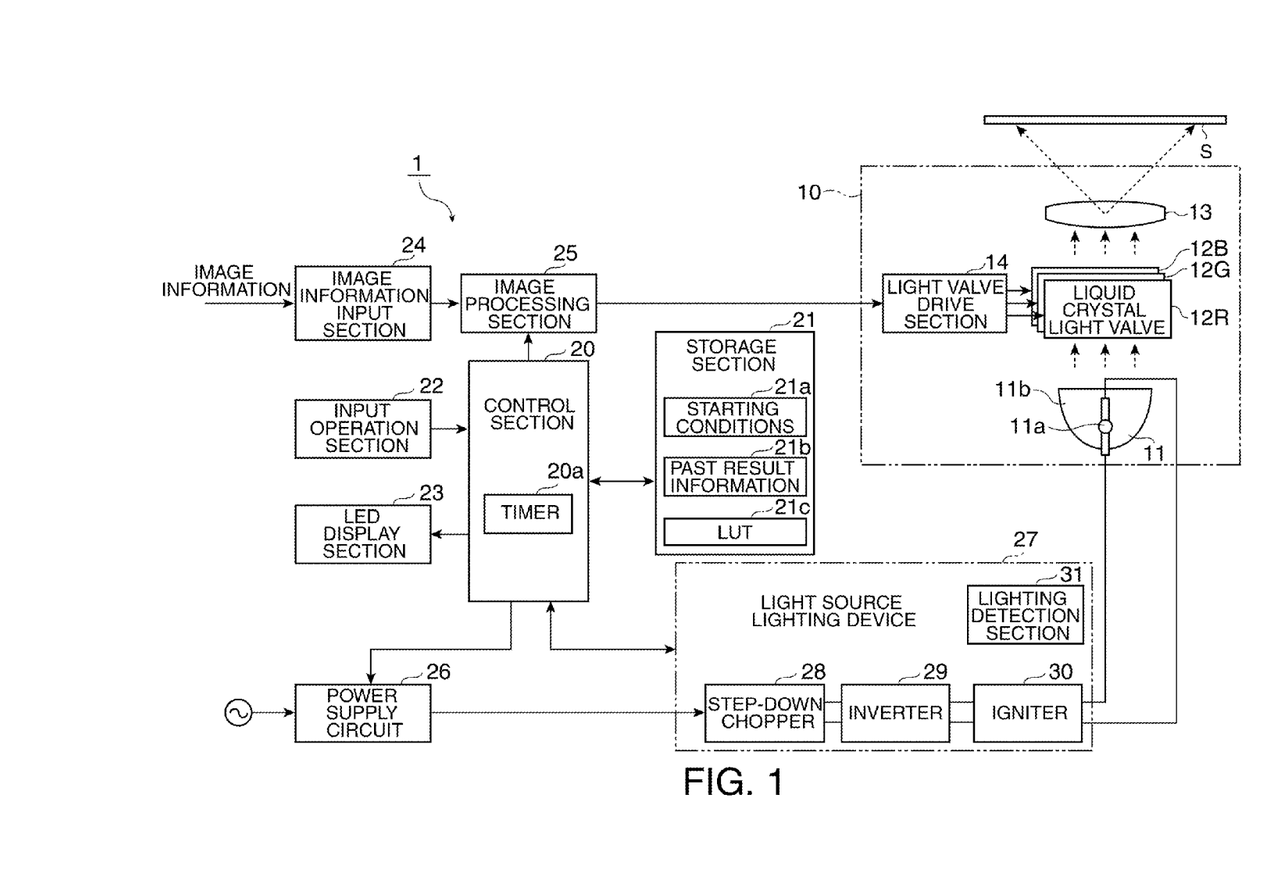
FIG. 1 is a block diagram showing a schematic configuration of a projector according to a first embodiment.

FIG. 1 is a block diagram showing a schematic configuration of the projector according to the present embodiment.

As shown in FIG. 1, the projector 1 is configured including an image projection section 10, a control section 20, a storage section 21, an input operation section 22, an LED display section 23, an image information input section 24, an image processing section 25, a power supply circuit 26, a light source lighting device 27, and so on.

The image projection section 10 includes a light source 11, three liquid crystal light valves 12R, 12G, and 12B as a light modulating device, a projection lens 13 as a projection optical system, alight valve drive section 14, and so on. The image projection section 10 corresponds to a display section, modulates light emitted from the light source 11 with the liquid crystal light valves 12R, 12G, and 12B to form an image, and then projects the image through the projection lens 13, thereby displaying the image on a projection surface S.

The light source 11 is configured including a discharge light source lamp 11a made of, for example, a super-high pressure mercury lamp or a metal halide lamp, and a reflector 11b for reflecting the light, which is emitted by the light source lamp 11a, toward the liquid crystal light valves 12R, 12G, and 12B. The light emitted from the light source 11 is converted into the light having a substantially even intensity distribution by an integrator optical system not shown, and is separated into colored light components of red (R), green (G), and blue (B), the three primary colors of light, by a color separation optical system not shown, and the colored light components subsequently enter the liquid crystal light valves 12R, 12G, and 12B, respectively.

The liquid crystal light valves 12R, 12G, and 12B are each composed mainly of a liquid crystal panel having a liquid crystal material encapsulated between a pair of transparent substrates. The liquid crystal light valves 12R, 12G, and 12B are each provided with a plurality of pixels (not shown) arranged in a matrix, and arranged that a drive voltage can be applied to the liquid crystal material corresponding to each of the pixels. When the light valve drive section 14 applies the drive voltages corresponding to image information input thereto to the respective pixels, the respective pixels are set to have light transmission corresponding to the image information. Therefore, the light emitted from the light source 11 is modulated while being transmitted through the liquid crystal light valves 12R, 12G, and 12B, thus the images corresponding to the image information are formed for the respective colored light. The images of the respective colors are combined pixel-by-pixel by a color combining optical system not shown to be formed as a color image, and then enlargedly projected through the projection lens 13.

The control section 20 is provided with a central processing unit (CPU) not shown, a random access memory (RAM) used for temporarily storing various data, and so on, and operates along a control program stored in the storage section 21, thereby performing the overall control of the projector 1. In other words, the control section 20 functions as a computer together with the storage section 21. Further, the control section 20 is provided with a timer 20a for measuring time.

The storage section 21 is composed mainly of a rewritable nonvolatile memory device such as a flash memory. The storage section 21 stores the control program for controlling the operation of the projector 1, various setting data for providing operational conditions and so on of the projector 1, and so on. Here, the storage section 21 of the present embodiment is provided with a starting condition storing section 21a storing the operational conditions (hereinafter referred to as "starting conditions") when starting the light source lamp 11a, a past result information storing section 21b storing past result information when having started the light source lamp 11a, and a look-up table (LUT) 21c for adjusting the starting conditions. It should be noted that the starting conditions and the past result information will be described later in detail.

The input operation section 22 is for receiving an input operation from the user, and is provided with a plurality of operation keys for the user to provide various instructions to the projector 1 such as a power key for switching between powering-on and powering-off of the projector 1. When the user operates the various operation keys of the input operation section 22, the input operation section 22 outputs an operation signal corresponding to the content of the operation by the user to the control section 20, in response to the input operation. It should be noted that it is also possible to adopt a configuration of using a remote controller (not shown) capable of a remote operation, as the input operation section 22. In this case, the remote controller emits an operation signal on an infrared ray corresponding to the content of the operation by the user, and then the remote control signal receiving section not shown receives the operation signal and transmits it to the control section 20.

The LED display section 23 is an indicator provided with an LED (light emitting diode), and switches the display state (e.g., lighting, blinking, extinction, and emission color) thereof based on the instruction of the control section 20, thereby informing the user of the operation state (e.g., powering-on, powering-off, and occurrence of an error) of the projector 1.

The image information input section 24 is provided with an input terminal not shown, and the image information output from an external image output device such as a video reproducing device or a personal computer is input thereto via a cable. The image information input to the image information input section 24 is supplied to the image processing section 25.

The image processing section 25 converts the image information input from the image information input section 24 into the image information representing the grayscales of respective pixels of the liquid crystal light valves 12R, 12G, and 12B. Here, the image information thus obtained by the conversion is separated so as to correspond to the colored light of R, G, and B, and is constituted with a plurality of pixel values corresponding respectively to all of the pixels of the liquid crystal light valves 12R, 12G, and 12B. The pixel values are for determining the light transmission of the corresponding pixels, and define the intensity (grayscales) of the light emitted through the respective pixels. Further, in accordance with the instruction of the control section 20, the image processing section 25 performs an image quality control process for controlling brightness, contrast, sharpness, color, and so on, and an on-screen display (OSD) process for overlapping an OSD image such as a menu image or a message image on the image information thus obtained by conversion, and outputs the image information thus processed to the light valve drive section 14.

When the light valve drive section 14 drives the liquid crystal light valves 12R, 12G, and 12B in accordance with the image information input from the image processing section 25, the liquid crystal light valves 12R, 12G, and 12B form the images corresponding to the image information, and the images are projected through the projection lens 13.

The power supply circuit 26 is supplied with the commercial power of, for example, 100V AC from the outside. The power supply circuit 26 converts the commercial power (alternating-current power) into direct-current power with a predetermined voltage, and supplies each section of the projector 1 with the direct-current power. Further, in accordance with the instruction of the control section 20, the power supply circuit 26 can switch between the state (the power-on state) of supplying each section with the power (the operation power) necessary for the projection of the image and the state (the stand-by state) of halting the supply of the operation power and standing ready and waiting for the operation for switching the power on.

The light source lighting device 27 is configured including a step-down chopper 28, an inverter 29, an igniter 30, and a lighting detection section 31, and lights the light source 11 (the light source lamp 11a) in accordance with the control of the control section 20. The step-down chopper 28 steps down the output voltage from the power supply circuit 26 to output it to the inverter 29, and then the inverter 29 converts the direct current, which is thus stepped down by the step-down chopper 28, into a rectangular alternating current.

The igniter 30 is for performing the starting operation for starting (lighting) the light source lamp 11a, and specifically applies a high-voltage pulse (an ignition pulse) between the electrodes of the light source lamp 11a to cause insulation breakdown, thereby forming a discharge path.

The lighting detection section 31 is for detecting the lighting state (whether or not the light source lamp 11a lights) of the light source lamp 11a, and specifically detects the lighting state based on the current (the light source current) consumed by the light source lamp 11a, and then outputs the detection result to the control section 20. It should be noted that the measure for detecting the lighting state is not limited thereto, but the lighting state can also be detected by an optical sensor, or by detecting the temperature of the light source lamp 11a.

The igniter 30 performs the starting operation (the application of the ignition pulse) described above, and when the lighting detection section 31 detects lighting of the light source lamp 11a, the igniter 30 stops the starting operation. Then, the light source lamp 11a is supplied with the rectangular alternating current generated by the inverter 29, thus the lighting state of the light source lamp 11a is maintained.

Figure 5:
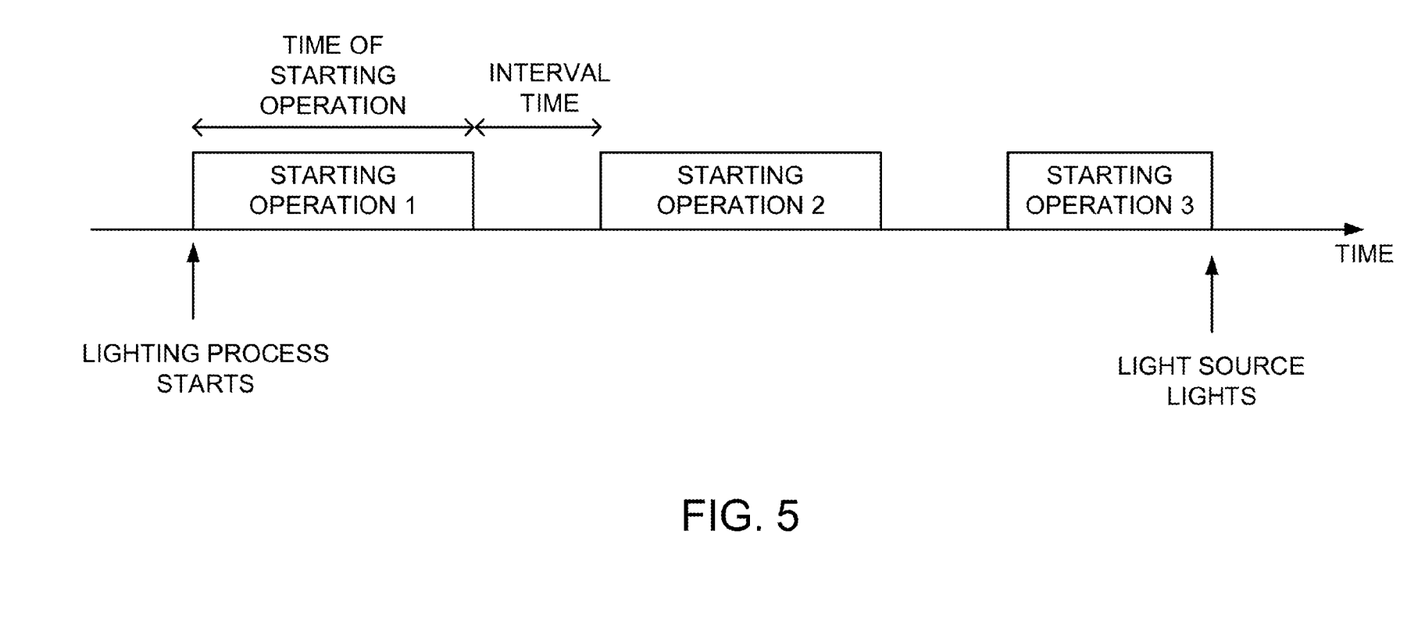
FIG. 5 is a time chart for explaining a process of operations to light the light source.

On the other hand, if the light source lamp 11a does not light despite the continuous starting operation for a predetermined period of time, the igniter 30 performs the starting operation again after a predetermined idle period (interval time), and thereafter repeats this operation until the light source lamp 11a lights. Further, in the case in which the light source lamp 11a does not light despite the fact that the starting operation is repeated a predetermined number of times, the igniter 30 does not perform any further starting operation. It should be noted that in the present specification, the case in which the light source lamp 11a does not light with a single starting operation is referred to as "non-lighting," and the case in which the light source lamp 11a does not light despite the fact that the starting operation is repeated the predetermined number of times is referred to as "lighting failure." FIG. 5 illustrates a process of these operations. The igniter 30 performs the starting operation three times and the light source lamp 11a lights at the third starting operation.

The operation of the projector 1 will hereinafter be explained.

When the projector 1 is supplied with the commercial power, the power supply circuit 26 supplies at least the control section 20, the storage section 21, the input operation section 22, and the LED display section 23 with the stand-by power, and the control section 20 starts the operation along the control program in response to the power supply. Immediately after the commercial power has been supplied, the projector 1 is in the stand-by state (also referred to as a "power-off state"), and maintains the state in which the light source lamp 11a is off. Then, when the user performs the operation (the switching-on operation) of the power key of the input operation section 22, the control section 20 gives an instruction to the power supply circuit 26 to start to supply each of the sections with the operation power, thereby having the projector 1 make the transition to the power-on state, and at the same time, gives an instruction to the light source lighting device 27 to start the light source lamp 11a.

Figure 2:
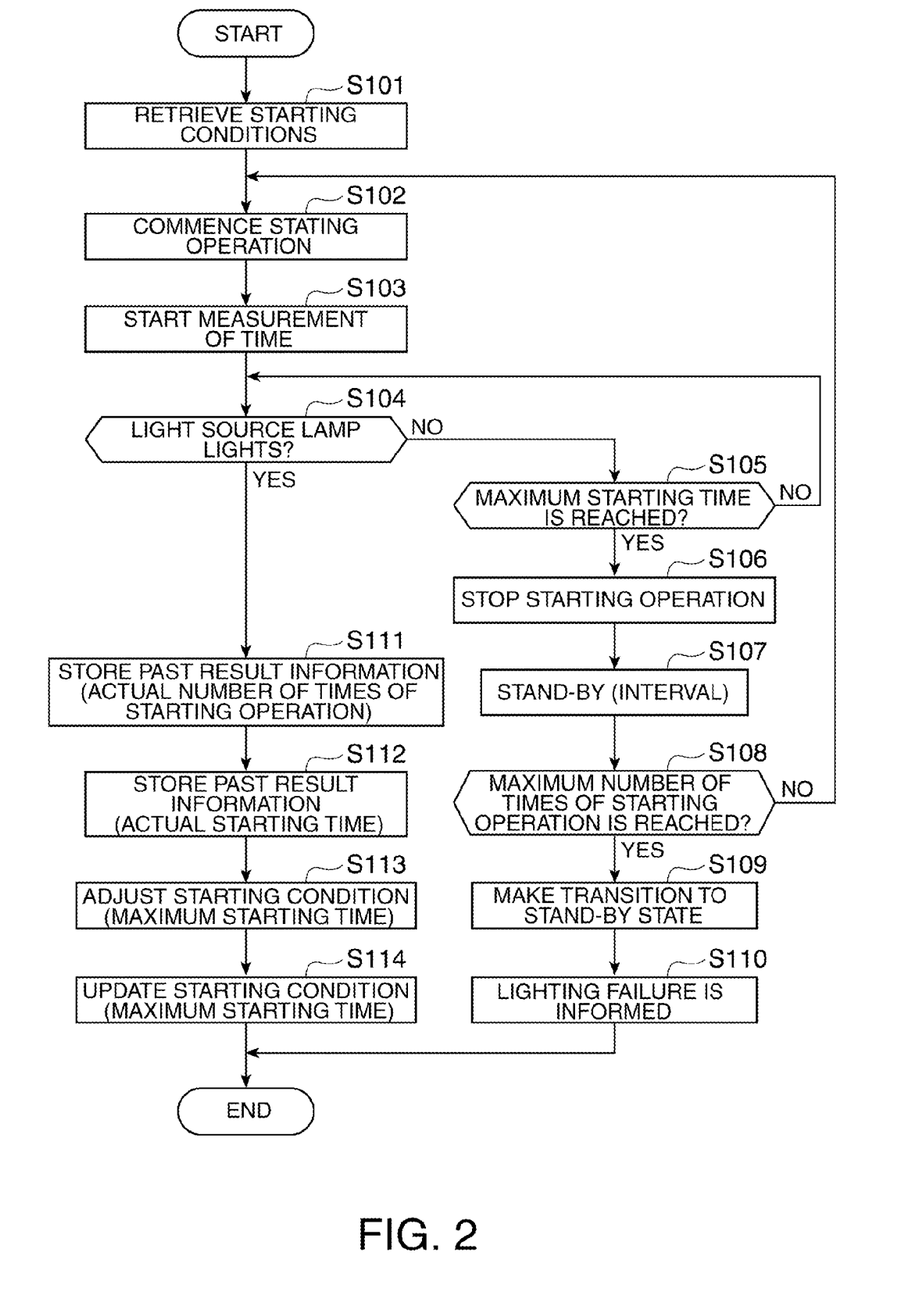
FIG. 2 is a flowchart for explaining an operation of a control section performed when starting the light source lamp in the projector according to the first embodiment.

FIG. 2 is a flowchart for explaining the operation of the control section 20 when starting the light source lamp 11a. When the projector 1 makes the transition to the power-on state in response to the execution of the switching-on operation by the user, the control section 20 operates along the flowchart shown in FIG. 2.

As shown in FIG. 2, in the step S101, the control section 20 retrieves the starting conditions stored in the starting condition storing section 21a of the storage section 21. As the starting conditions stored in the starting condition storing section 21a, there can be cited, for example, duration time (the maximum starting time) of each starting operation, interval time between the starting operations, and the maximum number of times (the maximum number of times of the starting operation) of repetition of the starting operation, and the control section 20 performs the subsequent operations based on the starting conditions. It should be noted that before shipment of the projector 1, standard starting conditions based on an experimental result and so on are stored, and for example, the maximum starting time is set to be 8 seconds, the interval time is set to be 1 second, and the maximum number of times of the starting operation is set to be 5 times.

In the step S102, the control section 20 makes the light source lighting device 27 (the igniter 30) commence the starting operation, namely the application of the ignition pulse to the light source lamp 11a, in accordance with the starting conditions retrieved in the step S101. Subsequently, in the step S103, in order for measuring the time elapsed from the commencement of the stating operation, the control section 20 resets the timer 20a to start to measure time.

In the step S104, the control section 20 determines whether or not the light source lamp 11a has lit based on the detection result of the lighting detection section 31. Then, if the light source lamp 11a has not yet lit, the process proceeds to the step S105, and if the light source lamp 11a has lit, the process proceeds to the step S111.

In the case in which the light source lamp 11a has not yet lit and the process has proceeded to the step S105, the control section 20 determines whether or not the time elapsed from the commencement of the starting operation reaches the maximum starting time as the starting condition. Further, if the elapsed time has reached the maximum starting time, the process proceeds to the step S106, and if it has not yet reached the maximum starting time, the process returns to the step S104 to repeat the lighting check of the light source lamp 11a.

In the case in which the maximum starting time has elapsed without lighting the light source lamp 11a, and the process has proceeded to the step S106, the control section 20 gives an instruction to the light source lighting device 27 (the igniter 30) to stop the starting operation on the light source lamp 11a.

In the step S107 subsequent thereto, the control section 20 stands ready in the state of halting the starting operation waiting until the interval time as the starting condition elapses. Specifically, the control section 20 resets the timer 20a to newly commence the time measurement, and stands ready waiting until the elapsed time reaches the interval time.

In the step S108, the control section 20 determines whether or not the number of times of performing the starting operation (the steps S102 through S106) has reached the maximum number of times of the staring operation as the starting condition. Then, if it has reached the maximum number of times of the starting operation, the process proceeds to the step S109. On the other hand, if it has not yet reached the maximum number of times of the starting operation, the process returns to the step S102, and the starting operation is repeated until the light source lamp 11a lights, or until the number of times of the starting operation reaches the maximum number of times of the starting operation.

In the case in which the light source lamp 11a does not light despite the fact that the starting operation has been performed the maximum number of times of the starting operation, and the process has proceeded to the step S109, the control section 20 gives an instruction to the power supply circuit 26 to stop supplying each of the sections with the operation power, thereby making the projector 1 become in the stand-by state. Subsequently, in the step S110, the control section 20 blinks the LED display section 23 in a red color, thereby informing the user of the lighting failure to end the flow.

On the other hand, in the case in which the light source lamp 11a has lit due to the starting operation, and the process has proceeded to the step S111, the control section 20 stores the number of times (the actual number of times of the starting operation) of execution of the starting operation into the past result information storing section 21b of the storage section 21 as a piece of the past result information. It should be noted that the actual number of times of the starting operation is temporarily stored in, for example, the RAM of the control section 20, and it is possible that the control section 20 resets it to be zero when executing the present flow, and then increments it by one every time the starting operation is commenced in the step S102.

In the step S112 subsequent thereto, the control section 20 stores the time (the actual starting time) required to be taken from when the starting operation is commenced to when the light source lamp 11a lights into the past result information storing section 21b of the storage section 21 based on the result of the time measurement by the timer 20a, as a piece of the past result information. Here, the past result information (the actual number of times of the starting operation and the actual starting time) is arranged to be cumulatively stored in the past result information storing section 21b, and the past result information storing section 21b stores the past result information corresponding to the number of times of lighting the light source lamp 11a by then.

In the step S113, the control section 20 performs adjustment of the starting conditions based on the past result information cumulatively stored in the past result information storing section 21b. Specifically, the control section 20 derives respective average values (an average actual number of times of the starting operation and an average actual starting time) of the actual number of times of the starting operation and the actual starting time targeting at the past result information corresponding to the latest 10 cases (all of the past result information if the past result information stored therein corresponds to 10 cases or smaller) out of the past result information cumulatively stored therein. Subsequently, the control section 20 derives a revised starting condition (the maximum starting time) from the two average values thus derived looking up the LUT 21c described later.

The LUT 21c is a two-dimensional look-up table having two inputs of the average actual number of times of the starting operation and the average actual starting time and an output of the maximum starting time, and in the present embodiment, it is arranged that the larger the average actual number of times of the starting operation is, the longer the maximum starting time becomes, and that the longer the average actual starting time is, the longer the maximum starting time becomes.

Further, after deriving the revised maximum starting time with the LUT 21c, in the step S114, the control section 20 rewrites (updates) the maximum starting time stored in the starting condition storing section 21a of the storage section 21 with the revised maximum staring time derived in the step S113 to end the flow. Thus, when lighting (starting) the light source lamp 11a next time, the starting operation is performed with the maximum starting time thus updated.

Here, as described above, in the LUT 21c, the larger the average actual number of times of the starting operation is, the longer the maximum starting time is set to be. In other words, in the case in which the average actual number of times of the starting operation is relatively large, namely in the case in which the probability of becoming non-lighting is high despite the execution of the starting operation, and the lighting property of the light source lamp 11a is relatively low, it become that each starting operation continues for a longer period of time. Therefore, the probability of getting to light within a single starting operation is raised, and it becomes possible to reduce the period of time taken before the light source lamp 11a starts to light. On the other hand, in the case in which the average actual number of times of the starting operation is relatively small, namely in the case in which the lighting property of the light source lamp 11a is relatively preferable, the maximum starting time becomes shorter. Therefore, even in the case in which the light source lamp 11a accidentally becomes in the non-lighting state in one starting operation, the subsequent starting operation is commenced quickly, and therefore, also in such a case, the period of time taken before the light source lamp 11a starts to light can be reduced.

Further, in the LUT 21c, the longer the average actual starting time is, the longer the maximum starting time is set to be. Therefore, even in the case of the light source lamp 11a having a tendency of requiring relatively long period of time before lighting, it can be prevented that shortage of the starting time occurs resulting in the non-lighting state. As a result, the probability of getting to light within a single starting operation is raised, and it becomes possible to reduce the period of time taken before the light source lamp 11a starts to light. On the other hand, since the maximum starting time becomes shorter in the case in which the average actual starting time is relatively short, even in the case in which the light source lamp 11a having a tendency of requiring relatively short period of time before lighting becomes accidentally in the non-lighting state, the subsequent starting operation is commenced quickly, and therefore, the period of time taken before the light source lamp 11a starts to light can be reduced.

As explained above, according to the projector 1 of the present embodiment, since the control section 20 adjusts, based on the past result information when the light source lamp 11a lights due to the starting operation, the starting conditions (the maximum starting time) in the later starting operations, it becomes possible to perform the later starting operations with the preferable starting conditions based on the past results of the actual starting operations, thus it becomes possible to reduce the period of time taken before the light source lamp 11a starts to light.

Further, according to the projector 1 of the present embodiment, since the starting conditions are adjusted based on the cumulatively stored plural past result information (10 cases), the influence due to the accidental actual result can further be reduced compared to the case based only on the past result information.

It should be noted that in the present embodiment, the control section 20 and the LUT 21c of the storage section 21 correspond to a starting condition adjustment section.

Second Embodiment

Figure 3:
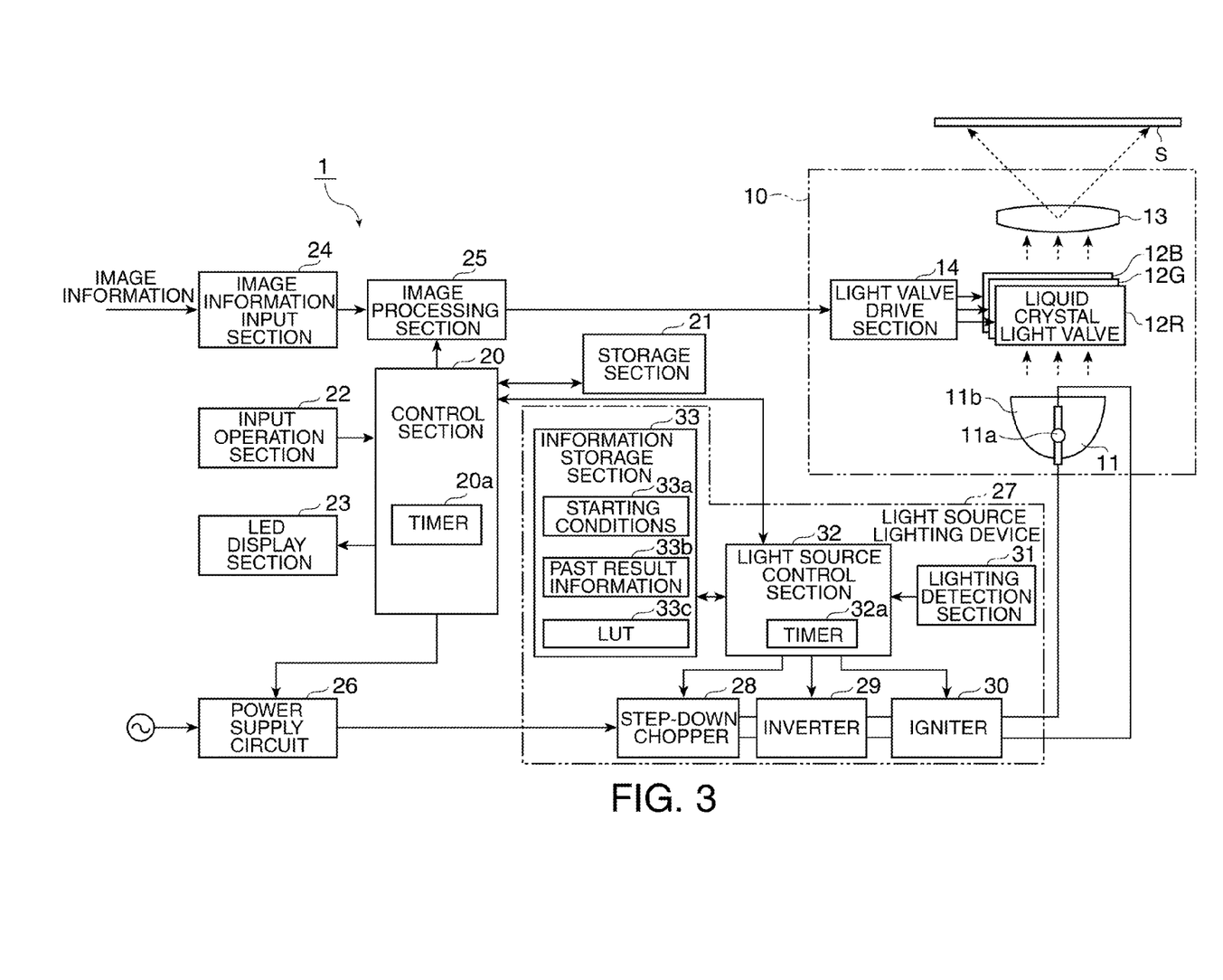
FIG. 3 is a block diagram showing a schematic configuration of a projector according to a second embodiment.

FIG. 3 is a block diagram showing a schematic configuration of the projector 1 according to the present embodiment. As shown in FIG. 3, the light source lighting device 27 according to the present embodiment is provided with a light source control section 32 and an information storage section 33 in addition to the configuration (the step-down chopper 28, the inverter 29, the igniter 30, and the lighting detection section 31) identical to that of the first embodiment.

The light source control section 32 is a microprocessor provided with a CPU and so on, and is arranged to be capable of communicating with the control section 20. Further, the light source control section 32 receives an instruction (a control command) from the control section 20, and controls the operation of the light source lighting device 27 in accordance with this instruction. Further, the light source control section 32 is provided with a timer 32a for measuring time.

The information storage section 33 is composed mainly of a rewritable nonvolatile memory device such as a flash memory. Further, in the present embodiment, the starting condition storing section 21a, the past result information storing section 21b, and the LUT 21c provided to the storage section 21 in the first embodiment are provided to the information storage section 33 as a starting condition storing section 33a, a past result information storing section 33b, and an LUT 33c, respectively.

The constituents other than those described above are the same as in the first embodiment.

The projector 1 according to the present embodiment is configured as described above, and when the user performs a switching-on operation, the control section 20 gives an instruction to the power supply circuit 26 to have the projector 1 make the transition to the power-on state, and at the same time, issues the control command to the light source control section 32 to start the light source lamp 11a.

Figure 4:
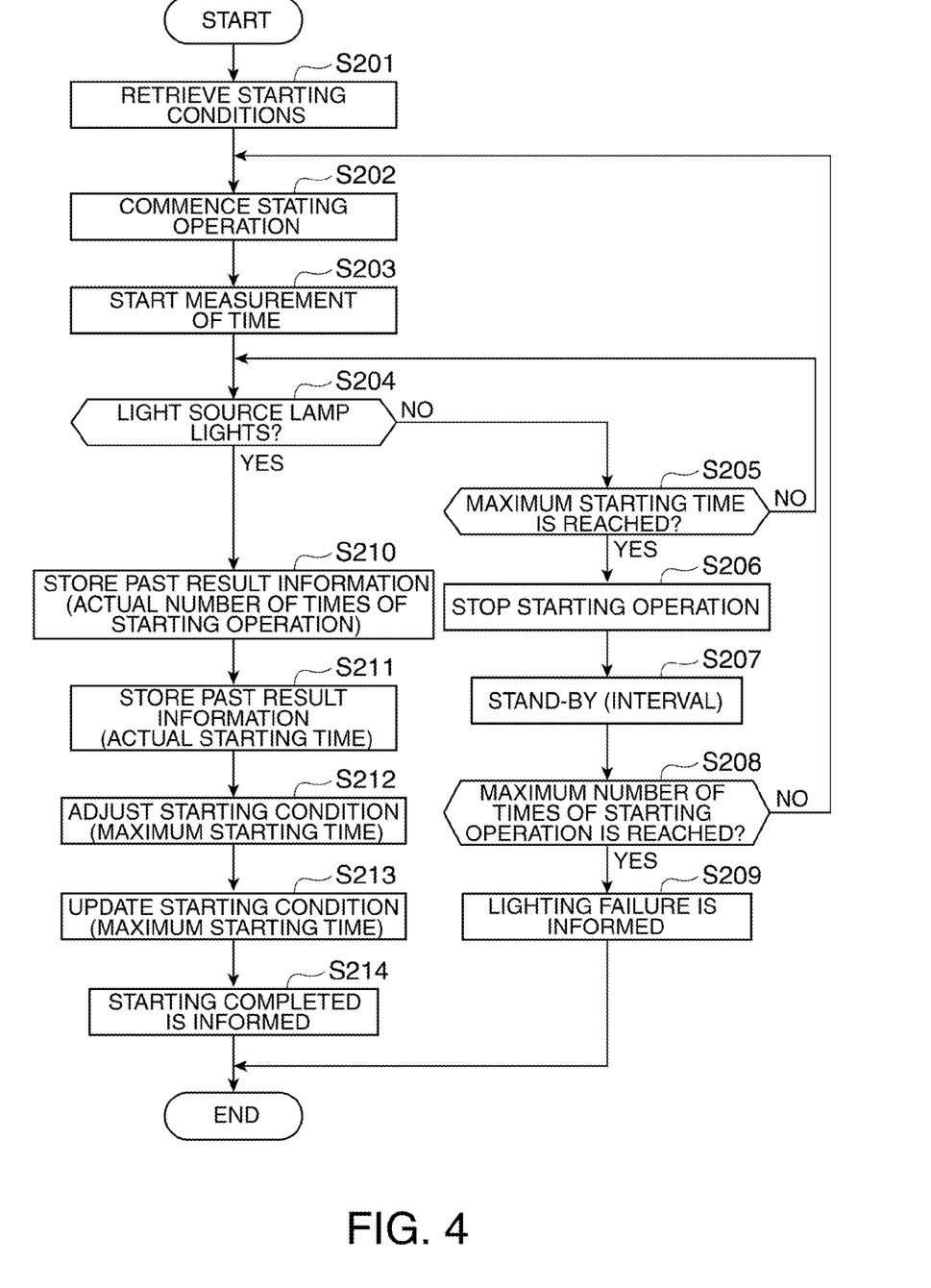
FIG. 4 is a flowchart for explaining an operation of a light source control section performed when starting the light source lamp in the projector according to the second embodiment.

FIG. 4 is a flowchart for explaining the operation of the light source control section 32 when starting the light source lamp 11a. When the control command for starting the light source lamp 11a is input from the control section 20, the light source control section 32 operates along the flow shown in FIG. 4.

As shown in FIG. 4, in the step S201, the light source control section 32 retrieves the starting conditions stored in the starting condition storing section 33a of the information storage section 33, and in the step S202, the light source control section 32 makes the igniter 30 commence the starting operation based on the starting conditions thus retrieved. Subsequently, in the step S203, in order for measuring the time elapsed from the commencement of the stating operation, the light source control section 32 resets the timer 32a to start to measure time.

In the step S204, the light source control section 32 determines whether or not the light source lamp 11a has lit based on the detection result of the lighting detection section 31. Then, if the light source lamp 11a has not yet lit, the process proceeds to the step S205, and if the light source lamp 11a has lit, the process proceeds to the step S210.

In the case in which the light source lamp 11a has not yet lit and the process has proceeded to the step S205, the light source control section 32 determines whether or not the time elapsed from the commencement of the starting operation reaches the maximum starting time as the starting condition. Further, if the elapsed time has reached the maximum starting time, the process proceeds to the step S206, and if it has not yet reached the maximum starting time, the process returns to the step S204 to repeat the lighting check of the light source lamp 11a.

In the case in which the maximum starting time has elapsed without lighting the light source lamp 11a, and the process has proceeded to the step S206, the light source control section 32 gives an instruction to the igniter 30 to stop the starting operation on the light source lamp 11a.

In the step S207 subsequent thereto, the light source control section 32 stands ready in the state of halting the starting operation waiting until the interval time as the starting condition elapses. Specifically, the light source control section 32 resets the timer 32a to newly commence the time measurement, and stands ready waiting until the elapsed time reaches the interval time.

In the step S208, the light source control section 32 determines whether or not the number of times of performing the starting operation (the steps S202 through S206) reaches the maximum number of times of the staring operation as the starting condition. Then, if it has reached the maximum number of times of the starting operation, the process proceeds to the step S209. On the other hand, if it has not yet reached the maximum number of times of the starting operation, the process returns to the step S202, and the starting operation is repeated until the light source lamp 11a lights, or until the number of times of the starting operation reaches the maximum number of times of the starting operation.

In the case in which the light source lamp 11a has failed to light despite the fact that the starting operation has been performed the maximum number of times of the starting operation, and the process has proceeded to the step S209, the light source control section 32 informs the control section 20 of the response representing the lighting failure to end the flow. When receiving the response, the control section 20 gives an instruction to the power supply circuit 26 to stop supplying each of the sections with the operation power to have the projector 1 make the transition to the stand-by state, and at the same time, blinks the LED display section 23 in the red color, thereby informing the user of the lighting failure.

On the other hand, in the case in which the light source lamp 11a has lit due to the starting operation, and the process has proceeded to the step S210, the light source control section 32 stores the number of times (the actual number of times of the starting operation) of execution of the starting operation into the past result information storing section 33b of the information storage section 33 as a piece of the past result information.

In the step S211 subsequent thereto, the light source control section 32 stores the time (the actual starting time) required to be taken from when the starting operation is commenced in the step S202 to when the light source lamp 11a lights into the past result information storing section 33b of the information storage section 33 based on the result of the time measurement by the timer 32a, as a piece of the past result information. Similarly to the case of the first embodiment, the past result information (the actual number of times of the starting operation and the actual starting time) is arranged to be cumulatively stored in the past result information storing section 33b, and the past result information storing section 33b stores the past result information corresponding to the number of times of lighting the light source lamp 11a by then.

In the step S212, the light source control section 32 performs adjustment of the starting conditions based on the past result information cumulatively stored in the past result information storing section 33b. Specifically, similarly to the case of the first embodiment, the light source control section 32 derives respective average values of the actual number of times of the starting operation and the actual starting time targeting at the past result information of the latest 10 cases out of the past result information stored cumulatively, and then, with reference to the LUT 33c, derives the revised starting condition (the maximum starting time) from the two average values thus derived.

In the step S213, the light source control section 32 rewrites (updates) the maximum starting time stored in the starting condition storing section 33a of the information storage section 33 with the revised maximum starting time derived in the step S212. Thus, when lighting (starting) the light source lamp 11a next time, the starting operation is performed with the maximum starting time thus updated.

In the step S214, the light source control section 32 informs the control section 20 of the response representing that the start of the light source lamp 11a has been completed normally to end the flow.

As explained above, according to the projector 1 of the present embodiment, advantages substantially the same as those in the first embodiment can be obtained. Further, since it is arranged in the present embodiment that the light source control section 32 provided to the light source lighting device 27 adjusts the starting conditions for the next time based on the past result information, by implementing the light source lighting device 27 in equipment other than the projector 1, it becomes possible to obtain substantially the same advantages in the equipment.

It should be noted that in the present embodiment, the light source control section 32 and the LUT 33c of the information storage section 33 correspond to the starting condition adjustment section.

Modified Examples

It should be noted that the embodiments described above can be modified as follows.

Although in the embodiments described above it is arranged that both of the actual number of times of the starting operation and the actual starting time are stored as the past result information, it is also possible to arrange that either one of the actual number of times of the starting operation and the actual starting time is stored, and the starting condition is adjusted based only on the one thus stored. Further, if it is arranged to monitor the voltage and the current applied to the light source lamp 11*a*, it is also possible to adopt these as the past result information.

Although in the embodiments described above only the maximum starting time among the starting conditions is used as the object of the adjustment, it is also possible to arrange that other starting conditions (e.g., the interval time, the maximum number of times of the starting operation, the applied voltage) are adjusted based on the past result information.

Although in the embodiments described above the average values are calculated targeting at the past result information of the latest 10 cases, the number of the past result information to be targeted at is not limited to 10, but can be equal to or larger than 11, or equal to or smaller than 9. Further, although the average value to be derived for adjusting the starting conditions can be a typical arithmetic average, if the weighted average with the more significant weight applied to the later past result information is adopted, the adjustment more significantly reflecting the temporal change of the light source lamp 11*a* and so on and the environmental variation becomes possible. Further, it is also possible to use other statistics values such as a mode value or a median value instead of the average value, or to arrange to perform the adjustment based only on the past result information of the latest case.

Since in the embodiments described above the adjustment of the starting conditions is performed based on the past result information corresponding to the latest 10 cases, it is not necessarily required to store the past result information older than these cases. However, in view of the usefulness in checking the history when performing inspection or repair, it is desirable to keep all of the past result information stored.

Although in the embodiments described above the adjustment of the starting conditions is performed using the LUT 21*c*, 33*c*, the invention is not limited to this configuration, but it is also possible to arrange to derive the starting conditions by calculations or the like. For example, it is also possible to increase or decrease the maximum starting time by a predetermined period of time (e.g., 0.5 second) in accordance with the variation in the average actual number of times of the starting operation, or to increase or decrease the maximum starting time by a predetermined period of time (e.g., 0.5 second) in accordance with the variation in the average actual starting time.

In the embodiments described above, when the light source 11 is replaced due to the life (burn-out of the lamp) of the light source lamp 11*a* and so on, it is desirable to clear (delete) the past result information stored in the past result information storing section 21*b*, 33*b*. Here, in order for making the operation for clearing the past result information unnecessary, it is also possible to arrange to implement the past result information storing section in the light source 11.

Although in the embodiments described above the three-panel projector 1 using the three liquid crystal light valves 12R, 12G, and 12B as the light modulation device is explained, the invention is not limited thereto. For example, it is also possible to adopt an aspect of forming the image with a single liquid crystal light valve having the pixels each including sub-pixels capable of respectively transmitting the R light, G light, and B light.

Although in the embodiments described above the transmissive liquid crystal light valves 12R, 12G, and 12B are used as the light modulation device, it is also possible to use a reflective light modulation device such as a reflective liquid crystal light valves. Further, a micromirror array device for modulating the light emitted from the light source by controlling the emission direction of the incident light of every micromirror as a pixel can also be used.

What is claimed is:

1. A projector adapted to modulate light emitted from a light source and project the modulated light, comprising:
   a light source lighting device adapted to perform a starting operation for starting lighting of the light source;
   a past result information storing section adapted to store past result information when the light source lights due to the starting operation; and
   a starting condition adjustment section adapted to adjust an operation condition in the starting operation to be performed later, based on the past result information stored in the past result information storing section.

2. The projector according to claim 1, wherein
   the light source lighting device performs the starting operation a plurality of times if the light source fails to light with the starting operation performed once, and
   the past result information storing section stores a number of times of the starting operation required for lighting the light source as the past result information.

3. The projector according to claim 2, wherein
   the starting condition adjustment section sets duration of each execution of the starting operation in a manner that the larger a number of times of the starting operation is, the longer the duration becomes.

4. The projector according to claim 1, wherein
   the light source lighting device performs the starting operation a plurality of times if the light source fails to light with the starting operation performed once, and
   the past result information storing section stores a period of time as the past result information, the period of time from time when the starting operation is commenced to time when the light source lights.

5. The projector according to claim 4, wherein
   the starting condition adjustment section sets duration of each execution of the starting operation in a manner that the longer the period of time required to be taken before the light source lights is, the longer the duration becomes.

6. The projector according to claim 1, wherein
   the past result information storing section cumulatively stores the past result information, and
   the starting condition adjustment section adjusts the operation condition based on the past result information of a plurality of cases stored cumulatively.

7. The projector according to claim 6, further comprising a look-up table having input of average values of the past result information of a plurality cases and an output of the operation condition, wherein,
   the starting condition adjustment section derives the average values of the past result information of a plurality cases and adjusts the operation condition by using the look-up table.

8. A light source lighting device adapted to perform a starting operation for starting lighting of the light source, comprising:
   a past result information storing section adapted to store past result information when the light source lights due to the starting operation; and
   a starting condition adjustment section adapted to adjust an operation condition in the starting operation to be performed later, based on the past result information stored in the past result information storing section.

9. A method of controlling a projector adapted to modulate light emitted from a light source and project the light modulated, comprising:
(a) performing a starting operation for starting lighting of the light source;
(b) storing past result information when the light source lights due to the starting operation; and
(c) adjusting an operation condition in the starting operation to be performed later, based on the past result information stored in step (b).

* * * * *